No. 695,330. Patented Mar. 11, 1902.
W. J. McCASLIN.
HOMINY HULLER AND WASHER.
(Application filed Aug. 22, 1901.)
(No Model.)

Witnesses
Inventor
William J. McCaslin,
By Edson Bros,
Attorneys

UNITED STATES PATENT OFFICE.

WILLIAM JOHN McCASLIN, OF NEWCASTLE, PENNSYLVANIA.

HOMINY HULLER AND WASHER.

SPECIFICATION forming part of Letters Patent No. 695,330, dated March 11, 1902.

Application filed August 22, 1901. Serial No. 72,921. (No model.)

*To all whom it may concern:*

Be it known that I, WILLIAM JOHN MCCASLIN, a citizen of the United States, residing at Newcastle, in the county of Lawrence and State of Pennsylvania, have invented certain new and useful Improvements in Hominy Hullers and Washers; and I do hereby declare the following to be a full, clear, and exact description of the invention, such as will enable others skilled in the art to which it appertains to make and use the same.

My invention relates to improvements in what may be termed "hominy or cereal hullers and washers."

It has for its object to provide for the advantageous admission of water to the contents of the kettle or receptacle, to supply water for the cleansing of the hominy or cereals, to provide a steam-supply, as in the separate operation of cooking, to effect the tilting of the receptacle or kettle, as in removing its contents, and to effect the automatic retention of said receptacle or kettle in its operative position and the ready actuation of the retaining mechanism of said receptacle; and to these ends the invention consists of the combination of parts, including their construction and arrangement, substantially as hereinafter more fully disclosed, and particularly pointed out by the claims.

Figure 1:
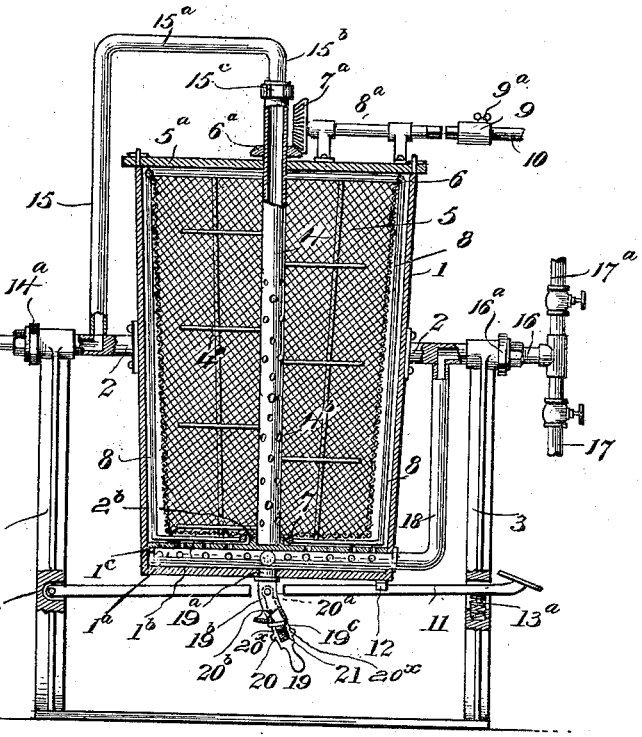
Figure 4:
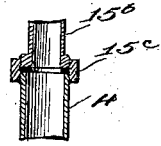
Figure 2:
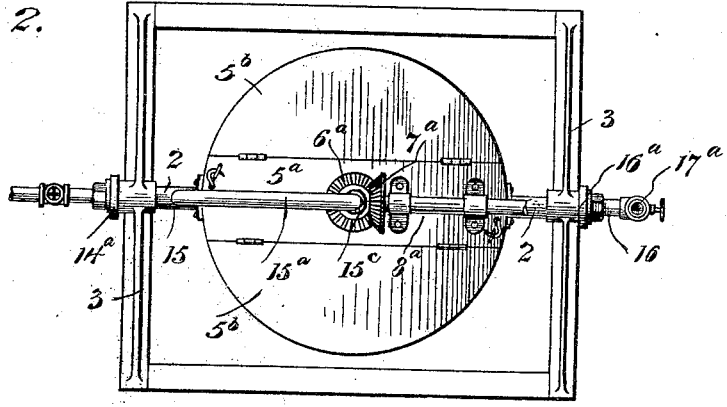
Figure 3:
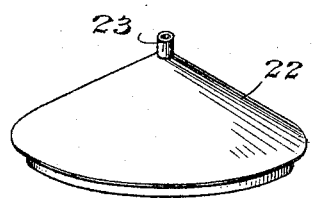

In the accompanying drawings, illustrating the preferred embodiment of my invention, Figure 1 is a sectional elevation. Fig. 2 is a plan view. Fig. 3 is a piped cover for used with the device as a cooker. Fig. 4 is a detail view showing more particularly the swivel connection between the overhanging and vertical pipes.

Latitude is allowed herein as to details, as they may be changed or varied at will without departing from the spirit of my invention and the same yet remain intact and be protected.

In carrying out my invention I employ a suitable kettle or cylindric receptacle 1, having fixed to its outside, about centrally thereof, two partially-bored journals or axes 2 2, which are preferably supported in the central standards of a framework 3 and which will be further presently referred to. Resting upon the bottom of the receptacle or kettle 1 is a spraying device or nozzle $1^a$, consisting, preferably, of a series of perforated radial tubes or pipes having connection through one of its arms with an outside steam, &c., pipe, hereinafter described. Above this spraying device or nozzle is arranged an auxiliary perforated bottom $1^b$, resting upon the upper edges of upturned portions or flanges $1^c$ of the kettle-bottom and provided with a central socketed stud $2^b$.

Within the kettle 1 is arranged a wire basket 5, preferably of coincident taper with the kettle 1 from top to bottom. Said basket preferably comprises a frame formed of top and bottom rings 6 and 7, respectively, the top ring being about of the same diameter as the upper edge of said basket and the lower or bottom ring being of much less diameter than and arranged about centrally of the bottom of the basket. These rings are connected by a series of longitudinal wires or bars 8 upon the outside of said basket, thus providing for leaving a space between said kettle or receptacle and the basket and auxiliary bottom for the passage thereinto of the hulls, &c.

Within the kettle or vessel 1 and interiorly of the wire receptacle 5 is disposed an agitator comprising a hollow shaft 4, having radial alternating arms $4^a$ and bearing at its lower end in the cylindric stud or projection $2^b$, a central opening or hole being provided in the bottom of the wire basket or receptacle therefor. Said shaft 4 has numerous lateral water passages or openings $4^b$, through which the water admitted thereto, as presently explained, is forced out in jets or streams into contact with the hominy or cereals placed in the receptacle or kettle, saturating the same and, aided by the action of a solution, preferably, of potash or lye, loosening or detaching the hulls thereof. The water is thus advantageously ejected into said cereals, together with the potash or lye solution, having the effect, in connection with the centrifugal action transmitted thereto through the rotation of the shaft and its arms, as also explained farther on, to forcibly act upon said cereals, thus providing for more effectually detaching said hulls. The upper end of the shaft 4, above the cross-bar $5^a$, has connected thereto a beveled pinion $6^a$, and with said pinion is geared, by a corresponding pinion $7^a$, a horizontal shaft $8^a$, suitably strapped or journaled upon said cross-bar. With the angular end of the shaft $8^a$ is adapted to be coupled, by a sleeve 9 and a set-screw $9^a$, the angular end of a driving-shaft 10.

The receptacle or kettle 1 is adapted, by being hung in position by means of the journals or axes 2, to be tilted so as to permit the ready emptying of its contents. In order to retain said kettle or receptacle in vertical or normal position as against tilting when cleaning and hulling the cereals, I provide a lever or latch 11, adapted to engage a notch in a beveled depending catch 12, secured to the under side of the bottom of said receptacle or kettle at right angles to said lever or latch. The lever or latch 11 is pivoted at one end, preferably in a slot 13 in one standard of the framework 3, and has its opposite end projecting through an opening or slot in the opposite standard of said frame to permit of convenience of its actuation by the foot. Said lever is automatically held in the notch of the catch 12 by a spring $13^a$, preferably secured in the last-referred-to slot or opening and bearing or pressing upon the under side of said lever. It will be seen that as the kettle or receptacle is returned to its upright position the lower beveled edge or surface of the catch 12 will engage the latch 11 and effect the actuation or depression of said latch, permitting it to automatically reënter the notch of said catch and lock said kettle in said position.

A valved pipe 14, leading from a suitable source of water-supply, connects with one end of the bore in the left-hand axis or journal of the kettle or receptacle 1, it having a suitably-swiveled and water-tight packed connection at $14^a$ with said journal to permit of the independent turning of the journal with said kettle as the last named is tilted and again returned to its upright position. A second pipe 15, also connecting with the bore of said left-hand journal of the kettle, has an overhanging portion or elbow $15^a$, itself having a pendent pipe or arm $15^b$, having a swiveled or stuffing-box connection $15^c$ with the upper end of the shaft 4, similar to the like connection between the water-pipe 14 and the left-hand journal of the receptacle 1, permitting the turning of said shaft and supplying of water thereto, which, as above noted, is delivered through the openings or passages in said shaft into the kettle or receptacle 1 for the treatment of the hominy or cereals, as hereinbefore described. To the opposite or right-hand hollow journal of said kettle or receptacle is swiveled or sleeved, as at $16^a$, a water-tight packed pipe 16, having valved branch pipes 17 $17^a$ connecting with a source of water and steam supply, respectively. A second pipe 18 connects with said right-hand hollow journal and has an elbow at its lower end connecting with the spraying-nozzle arranged in the bottom of the kettle to provide for admitting steam into said kettle, as when it may be used as a cooker, though not as at present equipped, it being required for that purpose to remove the water-feeding agitator-shaft, including its actuating mechanism, &c.

A faucet 19 is connected to a discharge-pipe $19^a$, secured to the bottom of the receptacle or kettle 1, to pass the water therefrom at a certain stage of the treatment of the cereals or contents of said kettle. Said faucet is of an approved form, though not of my conception, and it may be stated generally to comprise a barrel $19^b$, with a valve $19^c$ applied to the face of its discharge end. Said valve is carried by the gate 20, having parallel arms $20^a$ pivoted to the sides of the faucet-barrel, the forward end of said arms terminating in half yoke-like pieces or sections $20^x$, themselves extending into a common handle for said arms of gate. Said valve is limited in its movement to the arc of the seat therefor by opposite stops $20^b$ on the arms of said gate encountering the barrel of the gate. Said valve is suitably held upon its seat by preferably a a helical or coiled spring 21, arranged upon the stem thereof, both said stem and spring being suitably housed, as shown. It will be also observed that when it is desired to wash out the kettle the valve of the water-pipe 17 is opened, allowing the water to pass therefrom through the swiveled pipe connection 16, the right-hand bored journal, and the pipe 18 into the kettle or receptacle, said kettle or receptacle having been tilted, as in discharging or removing its contents.

Suitably hinged or pivoted to the longitudinal edges of the cross-bar $5^a$ are cover-sections $5^b$ to serve in connection therewith as a closure for the upper end of the kettle or receptacle 1, the same being suitably held in place.

The corn or other cereals to be treated or hulled are placed in the vessel or kettle with a quantity of potash or lye solution, say, sufficient to submerge the contents of the kettle and of the required strength to properly attack and aid the denuding the cereals of their hulls. Water is now passed from the pipe 14 by opening its valve through the pipes $14^a$ 15 $15^a$ and shaft 4 through its openings into the kettle. The agitator-shaft is now set in operation at a relatively moderate speed to aid the action of the potash or lye solution upon the cereals. The faucet or cock 19 is now opened and the agitator operated at a somewhat-higher rate of speed, effecting the thorough agitation of the contents of the kettle, releasing the hulls from the cereals. The hulls and other refuse all pass through the perforated or wire basket into the space between said basket and the kettle or vessel, passing downward and finally out, with the drainage at faucet or cock 19, thus disposing of the hulls and refuse-matter and cleansing the hulled cereals preparatory or ready for cooking. The cross-bar $5^a$ with gearing, agitator-shaft 4, and basket 5 are now removed and water added to the hulled and cleansed cereals still contained in the kettle. A conical cover 20, having an exhaust-steam outlet or escape at its apex, as at 20ª, is fitted upon the vessel or kettle 1 and said contents subjected to a steaming operation or action sufficiently long to effect the proper cooking of the thus cleansed and prepared cereals, the steam being admitted by opening the valve of the pipe 17ª, directing said steam through the parts 16 2 18 and the spraying device 1ᵇ, delivering it into said vessel at the bottom.

Having thus fully described my invention, what I claim, and desire to secure by Letters Patent, is—

1. In apparatus of the character described, a kettle or receptacle, a tubular shaft vertically arranged therein and having numerous lateral water-passages therethrough, hollow journals secured laterally to said kettle and suitably supported in position, a valved supply-pipe connecting with one of said journals, a pipe having an overhanging elbow, one end of said last-named pipe connecting with one of said journals and the other end of said pipe connecting with said tubular shaft, and means for actuating said tubular shaft, substantially as set forth.

2. In apparatus of the character described, a kettle or receptacle having laterally fixed thereto hollow or bored journals suitably supported in position, a tubular vertical shaft arranged centrally in said kettle and having agitator-blades and numerous lateral passages or openings therethrough, an overhanging pipe connecting with one end of said tubular shaft and one of said journals, a valved supply-pipe having one end connecting with the same journal, and means for actuating said tubular shaft, substantially as set forth.

3. In apparatus of the character described, a kettle or receptacle having laterally fixed thereto hollow or bored journals suitably supported in position, a tubular vertical shaft arranged in said kettle or receptacle and having numerous lateral passages or openings therethrough, a valved swiveled pipe connecting with one of said journals, and an overhanging pipe having one end connected to said journal and its other end swiveled to the upper end of said tubular shaft, and means for actuating said tubular shaft, substantially as set forth.

4. In apparatus of the character described, a kettle or receptacle, a tubular vertical shaft arranged in said kettle or receptacle and having numerous lateral passages or openings therethrough and agitator arms or blades, a driving or actuating shaft geared to the upper end of said tubular shaft, bored or tubular journals secured to said kettle and suitably supported in position, a valved pipe connected to one of said journals, and an overhanging pipe connected to the same journal and having the other end delivering into said tubular shaft, and also having a swiveled connection with said tubular shaft, substantially as set forth.

5. In apparatus of the character described, a kettle or receptacle, bored or hollow journals laterally secured to said kettle and suitably supported in position, a valved steam-pipe having swiveled pipe connection with one of said journals and a pipe connected to the same journal delivering into said kettle near its bottom, substantially as set forth.

In testimony whereof I affix my signature in presence of two witnesses.

WILLIAM JOHN McCASLIN.

Witnesses:
S. JAMES CALLAHAN,
WYLIE McCASLIN.